United States Patent

Boehly

[15] 3,678,222

[45] July 18, 1972

[54] TEST APPARATUS FOR DIGITAL REPEATERS

[72] Inventor: Michael A. Boehly, Rochester, N.Y.

[73] Assignee: Stromberg-Carlson Corporation, Rochester, N.Y.

[22] Filed: Nov. 25, 1970

[21] Appl. No.: 92,589

[52] U.S. Cl. .............179/175.31 R, 340/146.1 AB, 328/164

[51] Int. Cl. .......................................................H04b 1/60

[58] Field of Search ..........................179/175.31 R, 175.2 A; 178/69 A; 340/146.1 AB; 328/164

[56] References Cited

UNITED STATES PATENTS

| | | | |
|---|---|---|---|
| 2,857,484 | 10/1958 | Culbertson | 179/175.2 A |
| 3,062,927 | 11/1962 | Hamori | 179/175.31 R |
| 2,213,099 | 8/1940 | Adorjan | 179/175.31 R |
| 3,586,968 | 6/1971 | Barjot | 179/175.31 R |
| 3,461,426 | 8/1969 | Lender | 340/146.1 AB |

*Primary Examiner*—Kathleen H. Claffy
*Assistant Examiner*—Douglas W. Olms
*Attorney*—Charles C. Krawczyk

[57] ABSTRACT

Apparatus is disclosed that determines whether a digital repeater circuit correctly reproduces an input signal comprised of sequential groups of digital signals wherein each group includes a preset number of digital signals. A counter circuit receives a count corresponding to the number of digital signals in a group, and an error signal is produced in the event that the count at the end of a group of signals does not correspond to the preset number.

6 Claims, 5 Drawing Figures

MICHAEL S. BOEHLY
INVENTOR.

BY

ATTORNEY

MICHAEL S. BOEHLY
INVENTOR.

BY Charles C. Krawczyk
ATTORNEY

MICHAEL S. BOEHLY
*INVENTOR.*

BY *Charles [signature]*
*ATTORNEY*

MICHAEL S. BOEHLY
INVENTOR.

BY Charles C. Krawczyk
ATTORNEY

TEST APPARATUS FOR DIGITAL REPEATERS

BACKGROUND OF THE INVENTION

This invention relates to apparatus for testing digital repeaters in general, and more particularly, means for locating faulty or inoperative ones of a plurality of unattended pulse code modulation regenerative repeaters which are serially distributed over a transmission path.

Pulse code modulation systems have the advantage of being able to transmit information in digital form over large distances without significantly increasing noise or distortion in the signals. If analog signals (such as voice) are to be transmitted, the signals are converted from analog form into a train of digital bipolar pulses. In the event that digital data is to be transmitted, the data is also converted into bipolar form. For effective transmission of the PCM signals over long distances, pulse repeaters are often employed at intervals along the transmission path to regenerate the signal for a retransmission to the next repeater. The repeaters are required to reproduce the signal in its original form regardless of the distance over which the signal was transmitted. If one of the series repeaters is faulty, a distorted or error signal can be introduced into the message that will be repeated throughout the transmission path. The prior art methods of testing the operation of the repeaters are disclosed in the U.S. Pat. No. 3,083,270 for J.S. Mayo, entitled "Pulse Repeater Marginal Testing System," and U.S. Pat. No. 3,062,927 for A. Hamori, entitled "Pulse Repeater Testing Arrangement." These patents disclose systems for testing the threshold response of the repeaters and for determining whether repeaters are reproducing the signal in a proper bipolar form.

While the testing arrangements proposed by Mayo and Hamori have been effective in locating faults in the threshold circuitry and bipolar signalling, such apparatus is not capable of detecting faults due to a failure in the repeater to reproduce the proper number of pulses. The failure to reproduce the proper number of pulses results in a popping or crackling noise in the voice signals transmitted, or results in direct errors in the event that data is being transmitted. For example, a faulty repeater may be highly sensitive to noise so that it will add or delete the signal pulses in response to noise, or there may be a defect in the repeater synchronization circuit which deletes or adds signal pulses. It will therefore be highly advantageous if test equipment would be available for monitoring the operation of repeaters to determine if the repeaters accurately reproduce the number of pulses received.

It is therefore an object of this invention to provide a new and improved test apparatus for testing the operation of PCM repeaters.

It is also an object of this invention to provide a new and improved test apparatus for determining whether a PCM repeater is properly reproducing the correct number of input digital pulses applied thereto.

BRIEF DESCRIPTION OF THE INVENTION

The test apparatus of the invention functions in conjunction with a test set of the type described in the U.S. Pat. No. 3,062,927 that applies input signals, comprised of sequential groups of digital signals wherein each group includes a preset number of digital signals, to the input of a digital repeater. A control circuit adapted to be connected to the output of the repeater detects the presence of the digital signals in a group and applies a corresponding number of counts to a counter circuit. Circuit means determines whether the count in the counter circuit corresponds to the preset number of pulses.

DESCRIPTION OF THE PREFERRED EMBODIMENT

Figure 1:
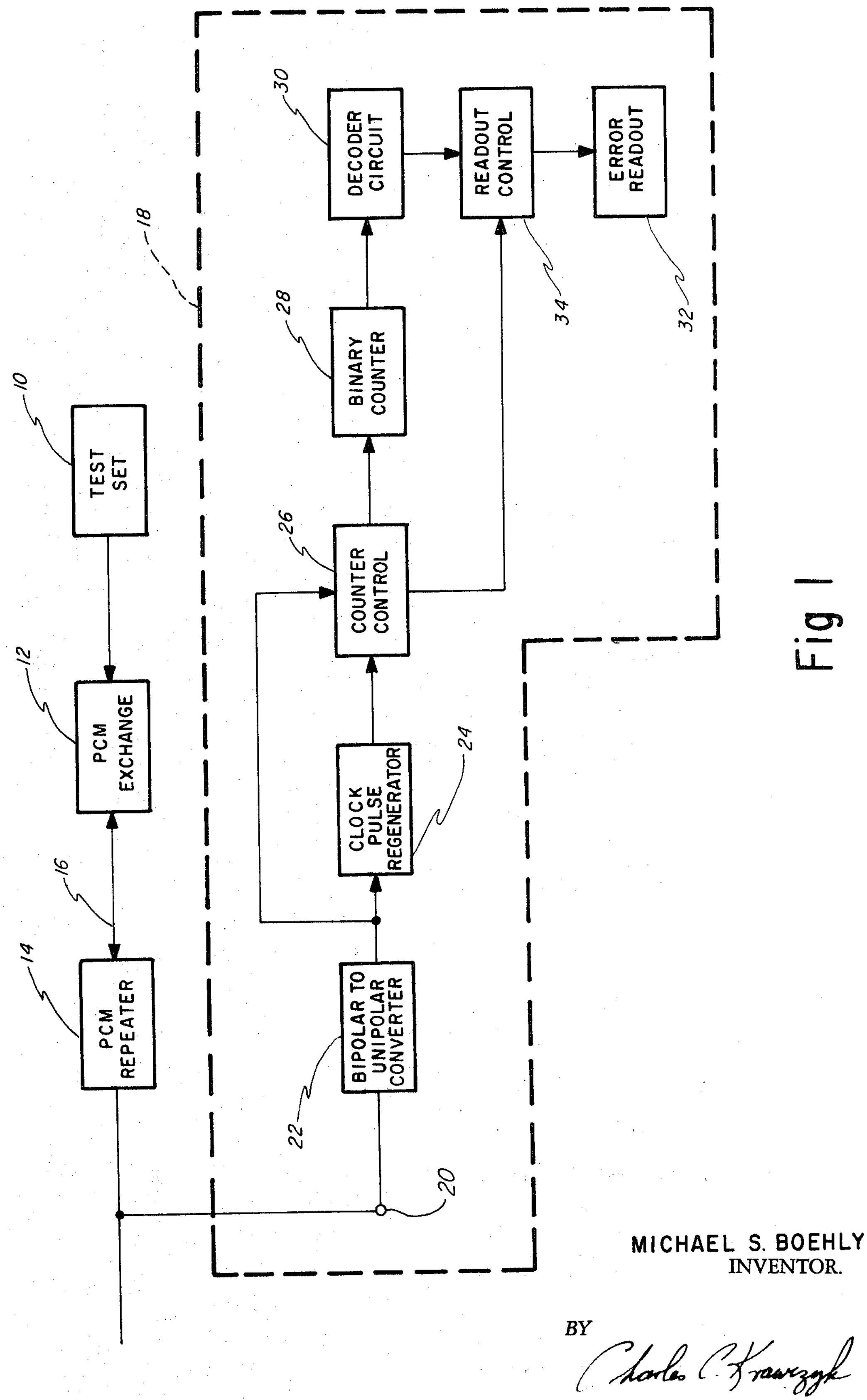
FIG. 1 includes a block diagram of the test apparatus of the invention connected to monitor the operation of a PCM repeater.

When testing a PCM repeater for proper operation, a test set 10 of the type disclosed in the U.S. Pat. No. 3,062,927 is connected at an exchange 12 to apply input test signals to the repeater 14 via the transmission line 16. The test signals comprise a sequential series of groups of three bipolar signals, (waveform 17, FIG. 3) and wherein the time period, or spacing, between the groups of signals is varied to measure the quality of operation of the repeater 14 under test. The test equipment of the present invention (within the dashed block 18) is connected to the output of the repeater 14 to operate in conjunction with the test set 10 to determine whether the repeater under test is reproducing the proper number of received signal pulses.

An input terminal 20 of the test equipment 18 is connected to the output of the repeater 14 under test. The bipolar signals received from the repeater (waveform 21, FIG. 3) are converted to unipolar pulses (waveform 23, FIG. 3) by a bipolar-to-unipolar converter circuit 22. The output of the converter circuit 22 is connected to a clock pulse regenerator circuit 24 and a counter control circuit 26. The regenerator circuit 24 provides the clock pulses (waveforms 25 and 27, FIG. 3) for controlling the various timing sequences of the test equipment of the invention. The regenerator circuit 24 receives output signals from the converter circuit 22 for synchronizing the operation of the regenerator circuit 24 with pulses from the repeater 14.

The clock pulses from the regenerator circuit 24 are applied to the counter control circuit 26. The counter control circuit 26 functions to transmit the clock pulses (waveform 29, FIG. 3) from the regenerator 24 to a binary counter 28 during the presence of incoming signal pulses at terminal 20, and also controls the reset sequence (waveform 31, FIG. 3) of the binary counter circuit 28 after each group of signal pulses have been received. The binary counter 28 counts clock pulses during the presence of the input signal and applies the count to a decoder circuit 30. The decoder circuit functions to determine whether an error has been introduced by the repeater 14 and applies a signal denoting the error (waveform 33, FIG. 3) to an error readout device 32 via a readout circuit 34. The readout circuit 34 is also connected to the counter control circuit 26 to synchronize the transmission of the error signal to the readout device 32 to the time period between received signal groups.

Figure 2:
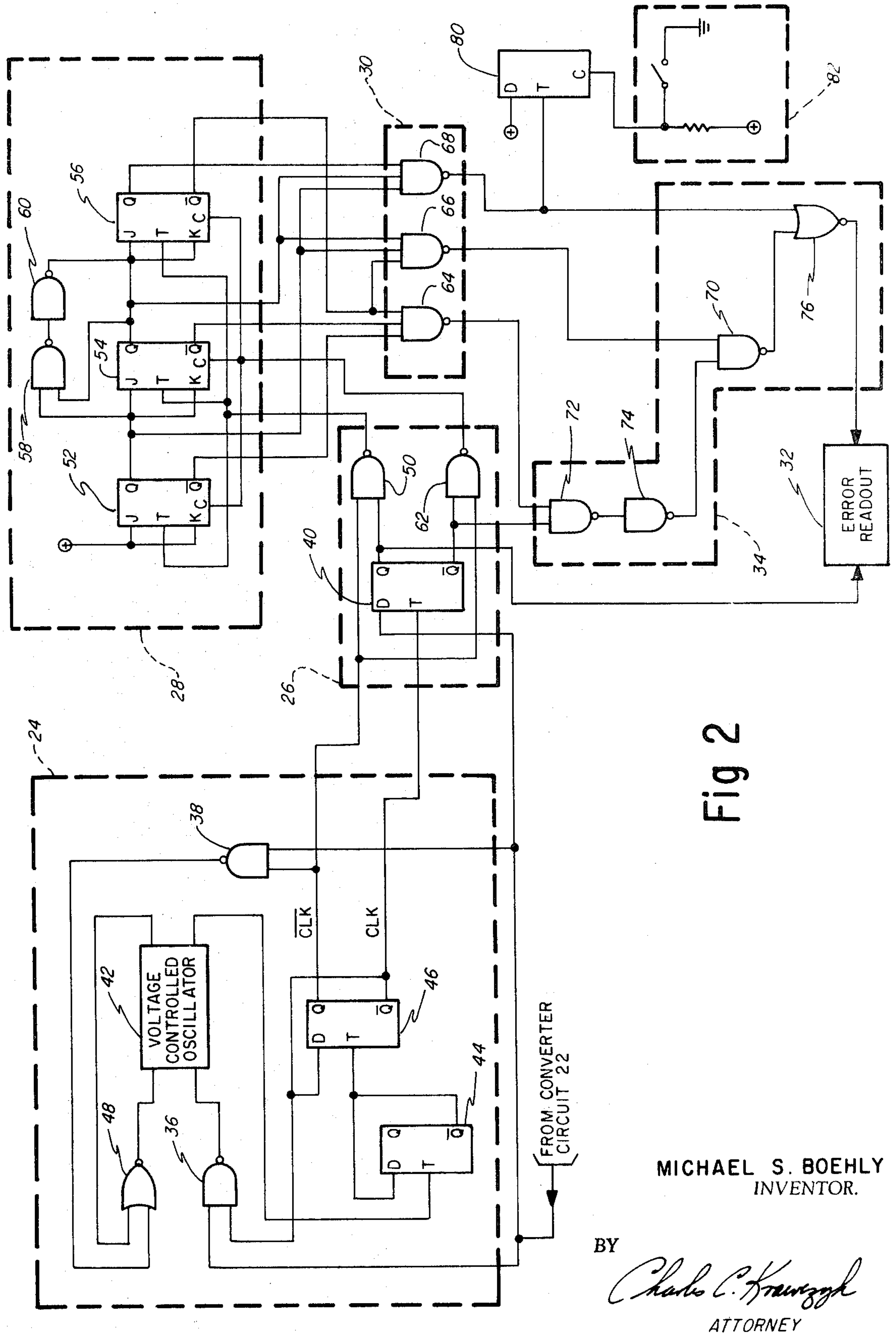
FIG. 2 includes a logic diagram of the test apparatus of FIG. 1.

Referring to FIG. 2, the unipolar pulses from the converter circuit 22 are applied to an input circuit of the NAND gates 36 and 38 in the regenerator circuit 24 and also to the D input of a flip-flop 40 of the counter control circuit 26. The regenerator circuit includes a voltage control oscillator 42 having an output frequency approximately four times that of the incoming unipolar pulses. The output of the oscillator circuit 42 is connected to a frequency divider circuit including a first flip-flop 44 and a second flip-flop 46. The flip-flops 44 and 46 are interconnected to divide the frequency output of the voltage control oscillator 42 by a factor of four to provide clock pulses (CLK) at the $\overline{Q}$ output of flip-flop 46 (waveform 25) not clock pulse ($\overline{CLK}$) at the Q output, that correspond to the frequency of the unipolar signals from the converter 20.

The NAND gate 36 and a NOR gate 48 are connected to the voltage oscillator 42 to provide a control signal to maintain the frequency of oscillation synchronized with the unipolar pulses. As previously mentioned, one input of the NAND gate 36 receives unipolar pulses from the converter 20, while the other input is connected to the Q (clock) output of the flip-flop 46, and, hence, the NAND gate 36 is enabled during the simultaneous presence of the clock pulses and the unipolar pulses. One input of the NAND gate 38 is connected to the Q input of the flip-flop 46 while the other input is connected to receive the unipolar pulses wherein the NAND gate 38 is enabled during the presence of a unipolar signal and the not clock ($\overline{CLK}$) pulses (waveform 27). The output of the NAND gate 38 is connected to one input circuit of the NOR gate 48 while the other input circuit is connected to the output of the oscillator circuit 42. A signal pulse is therefore applied to the one of the control circuits of the oscillator 42 from the NOR gate 48 during each half cycle of the oscillator signal and during the simultaneous presence of the unipolar pulses and $\overline{CLK}$ pulses. The arrangement is such that control signals are developed at the outputs of the NAND gate 36 and NOR gate 48 that function to synchronize the frequency of oscillation of the oscillator circuit 42 to the repetition rate of the unipolar pulses received from the converter circuit 20. The operation of the voltage control oscillator 42 and its control circuit is explained in greater detail with regards to FIG. 5.

The control flip-flop 40 is "set" during the simultaneous presence of the first unipolar signal of each group of signals and a CLK pulse. The flip-flop 40 remains "set" until the occurrence of a CLK pulse after the last unipolar pulse in that group has been received. The flip-flop 40 provides a non-return-to-zero type of signal (waveform 49, FIG. 3) at the Q output circuit. One input of a NAND gate 50 is connected to the Q output of flip-flop 40 while the other input of the NAND gate 50 is connected to the Q output of the flip-flop 46. During the period the flip-flop 40 is "set," the NAND gate 50 transmits the $\overline{CLK}$ pulses (waveform 29) to the binary counter circuit 28. The binary counter 28 includes three flip-flops 52, 54 and 56 and a NAND gate 58 and an inverter circuit 60 interconnected to provide a conventional three bit binary counter having eight states. A NAND gate 62 is connected to the counter circuit 28 to function as a reset circuit. One input circuit of the NAND gate 62 is connected to the Q output of the flip-flop 46 while the other input circuit is connected to the $\overline{Q}$ output of the flip-flop 40. The output of the NAND gate 62 is connected to the reset terminals of the flip-flops 52, 54 and 56 to "reset" the counter flip-flops during the first $\overline{CLK}$ pulse after the control flip-flop 40 is "reset" (waveform 31).

The output of the binary counter circuit 28 is connected to the decoder circuit 30 which includes the NAND gates 64, 66 and 68. The NAND gate 64 is connected to the binary counter to be enabled at a binary count of zero. The NAND gate 66 is connected to be enabled at the binary count of three, while the NAND gate 68 is connected to be enabled at the count of seven.

The output of the NAND gate 66 is coupled to the input of a NAND gate 70 to inhibit the NAND gate 70 when a correct count of three is present in the binary counter circuit 28. The output of a NAND gate 64 is connected to an input circuit of a NAND gate 72 while the other input of the NAND gate 72 is connected to the $\overline{Q}$ output of flip-flop 40. The output of the NAND gate 72 is connected via an inverter circuit 74 to the second input of the NAND gate 70. The output circuit of the NAND gate 70 is connected to one of the input circuits of a NOR gate 76 while the output of the NAND gate 68 is connected to the other input. The output circuit of the NOR gate 76 is connected to the error readout device 32.

As previously mentioned, the control flip-flop 40 is "reset" by the first $\overline{CLK}$ pulse after the last unipolar pulse of a group has been received (waveform 49). When the flip-flop 40 is "reset," and if a count is present in the counter 28 other than zero, the NAND gate 72 is enabled to apply a partial enable signal to the NAND gate 70. If a count is present in the counter 28 other than three, the NAND gate is enabled to apply an error signal (waveform 33, FIG. 3) to the error readout device 32 via the NOR gate 76. The output circuit of the NAND gate 68 is connected to the other input circuit of a NOR gate 76 to provide an error signal in the event the count in the binary counter 28 should pass a count of seven thereby avoiding an ambiguous condition wherein the counter 28 would count through an entire counting cycle plus an additional three counts and wherein an error condition might otherwise be considered a normal condition. The output of the NAND gate 68 is also connected to a memory device 80, such as for example, as a flip-flop circuit to denote that a count greater than seven has been monitored. A switching circuit 82 is connected to the memory circuit 80 to reset the memory circuit 80 after a reading has been taken. The error readout device 32 can, for example, be a counting circuit providing a count corresponding to the number of error transmissions and/or an indicator, such as a light or a relay, that is operated in response to the presence of an error condition.

Figure 3:
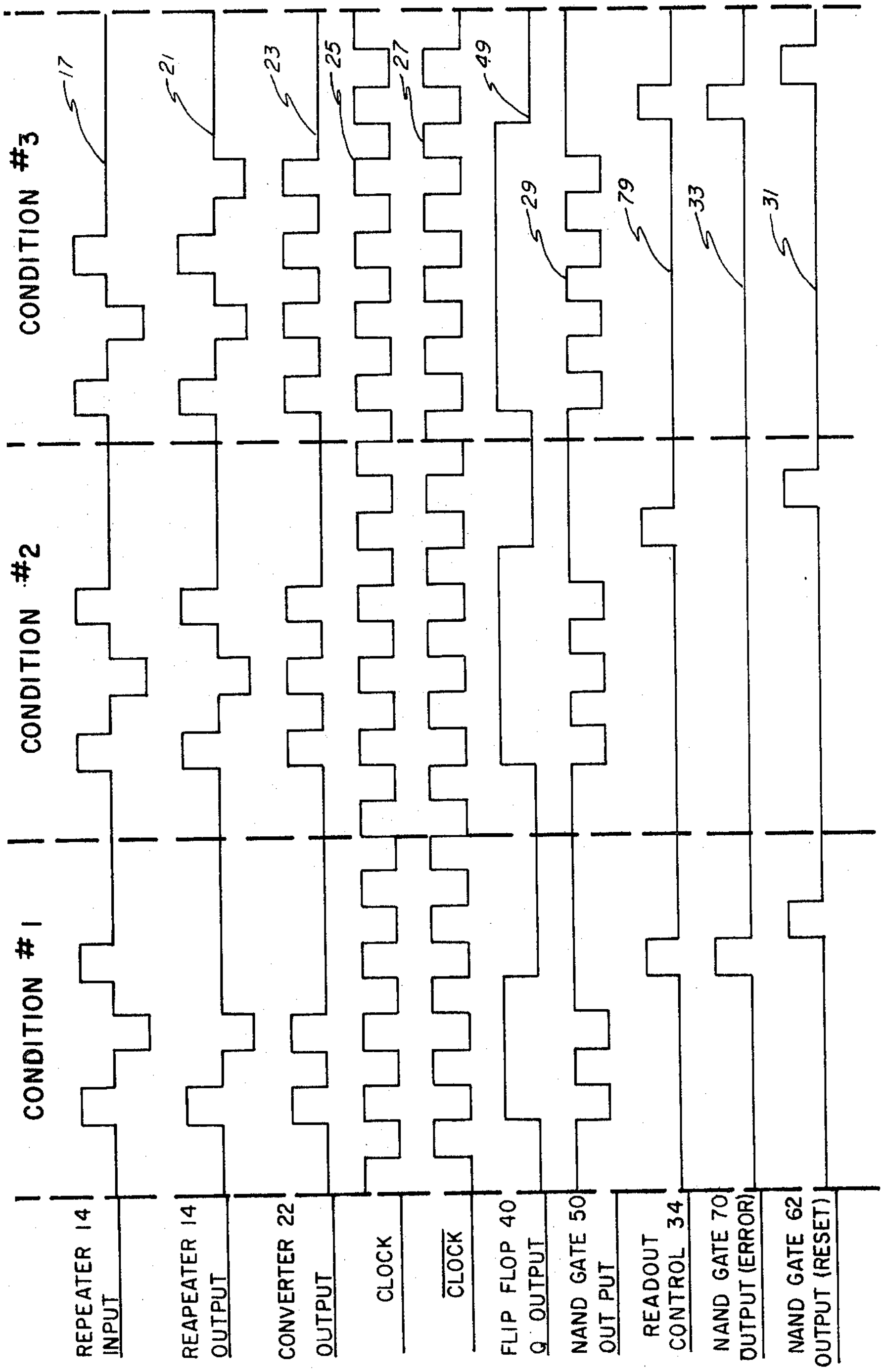
FIG. 3 includes a plurality of waveforms used in connection with describing the operation of the test apparatus of the invention.

The waveforms of FIG. 3 are plotted as a function of time, wherein: (1) condition No. 1 indicates a failure wherein the repeater 14 deletes one of the pulses received, (2) condition No. 2 indicates normal repeater operation, and (3) condition No. 3 indicates a failure wherein the repeater generated an extra pulse. The waveform 17 corresponds to the input signals to the repeater 14, while the waveform 21 corresponds to the output of the repeater. The waveform 23 corresponds to the output of the converter circuit 22. The waveform 25 corresponds to the clock (CLK) pulses from the Q output of the flip-flop 46, while the waveform 27 corresponds to the not clock pulses ($\overline{CLK}$) from the Q output. The waveform 49 corresponds to the non-return-to-zero signal at the Q output of the flip-flop 40. The waveform 29 corresponds to the counting signals transmitted by gate 50 to the counter circuit 28. The waveform 79 corresponds to the output of the inverter 74 in the readout control. The waveform 33 corresponds to the error signal output from the NAND gate 70. The waveform 31 corresponds to the reset signal at the output of the NAND gate 62 for resetting the counter.

In condition No. 1, the repeater 14 has deleted one of the input pulses so that the counter circuit only receives two pulses (waveform 23). At the time of the readout pulse (waveform 79), the NAND gate 70 is enabled by the output of the NAND gate 66 to produce the error pulse (waveform 33).

In condition No. 2, the repeater is properly functioning and three pulses are applied to the counter 28 (waveform 29). When the readout pulse (waveform 79) is generated, a count of three in the counter enables the NAND gate 66, which, in turn, disables the NAND gate 70 and no error signal will be present (waveform 33).

In condition No. 3, the repeater 14 has added an extra signal pulse (waveform 21) so that the counter circuit receives four pulses (waveform 23) at the time of the readout pulse (waveform 79). The NAND gate 70 is enabled to produce the error pulse (waveform 33).

Figure 4:
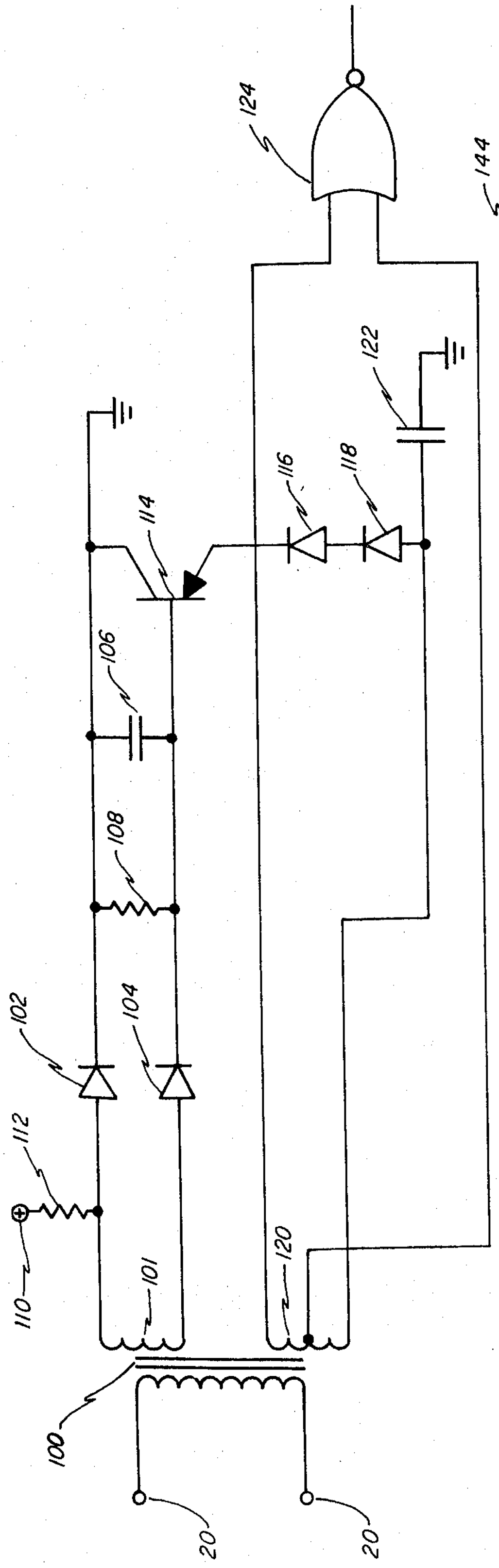
FIG. 4 includes a circuit diagram of the converter circuit of FIG. 1.

The circuit of FIG. 4 includes an embodiment of the bipolar-to-unipolar converter circuit 22 of FIG. 1. The input terminals 20 are connected to a primary winding of a transformer 100. The secondary winding 101 of the transformer 100 is coupled through a pair of diodes 102 and 104 to a filter circuit including a capacitor 106 in parallel with the resistor 108. The anode of the diode 102 is connected to ground while the cathode is connected to terminal 110 of a positive power source through a resistor 112. The anode of a diode 104 is connected to a base of a transistor 114. The emitter of the transistor 114 is connected to a center tap of a secondary winding 120 via the diodes 116 and 118, while the collector is connected to ground. A filter capacitor 122 is connected between the center tap and ground. Opposite ends of the secondary winding 120 are connected to separate input circuits of a NOR gate 124, the output of which is connected to the regenerator circuit 24 and counter control circuit 26.

The transistor circuit connected to the secondary winding 101 functions to provide a variable threshold arrangement for the converter circuit, while the secondary winding 120 provides the switching signals to the NOR gate 124. The arrangement is such that with an input signal of the type illustrated by waveform 21, the converter circuit 22 provides a unipolar output signal as illustrated by waveform 23. The incoming bipolar pulses from the repeater 14 are applied to the terminals 20. Depending upon the polarity of the applied pulse, a negative going pulse is applied to one of the input circuits of the NOR gate 124 so that a stream of positive going pulses occupy the time slot relative to the input bipolar pulses. The output from the secondary winding 101 produces a positive voltage bias across a resistor 108 which changes with the input level of the pulses and produces a DC potential at the center tap of the winding 120. This potential adjusts the threshold of the converter circuit. This type of circuit is well known in the art and does not require any further information.

Figure 5:
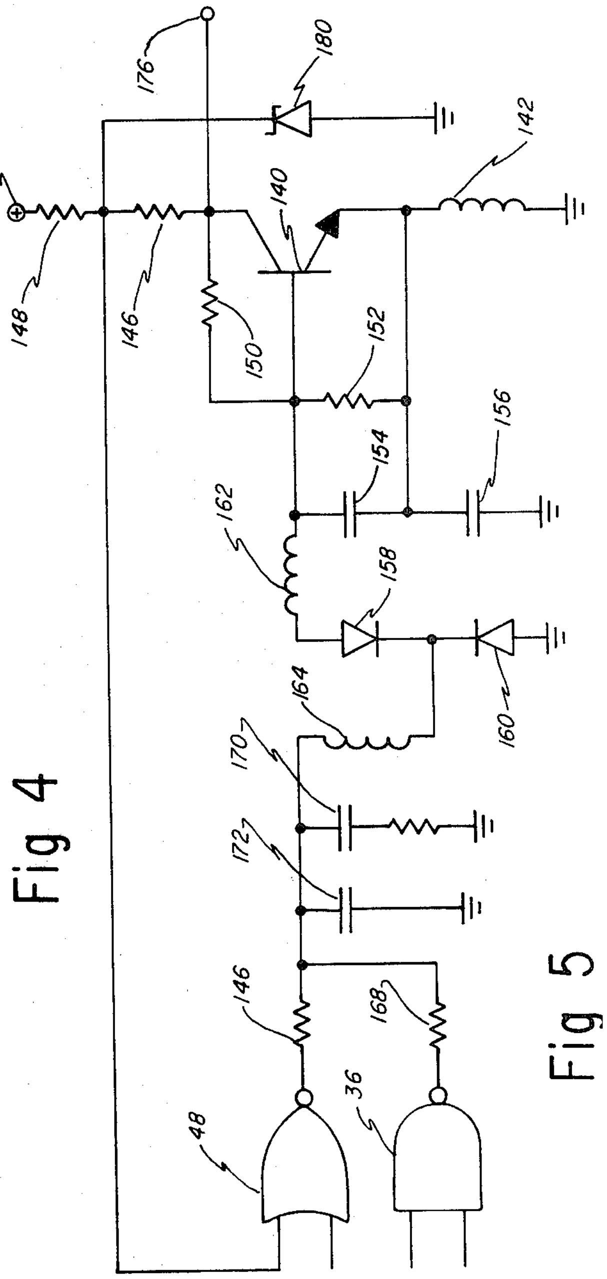
FIG. 5 includes a schematic diagram embodiment of the voltage controlled oscillator circuit of FIG. 2.

An embodiment of the voltage control oscillator 42 is illustrated in FIG. 5 including a transistor 140. The emitter of the transistor 140 is connected to ground through a inductor 142 while the collector is connected to a terminal 144 of a positive power supply via resistors 146 and 148. A biasing circuit is provided for the base of the transistor 140 which includes the series resistors 150 and 152 connected between the collector and emitter of the transistor 140 and wherein the junction therebetween is connected to the base. A pair of capacitors 154 and 156 are connected in a series circuit between the base and ground with the capacitor 154 connected in shunt with the resistor 152. A pair of back-to-back diodes 158 and 160 are connected in a series circuit with an inductor 162 between the base of the transistor 140 and ground under an arrangement wherein the diodes 158 and 160 function as voltage controlled variable capacitors to control the frequency of oscillation. The junction of the diodes 158 and 160 is connected through an inductor 164 to the NAND gate 36 and the NOR gate 48 via the summing resistors 166 and 168, respectively. A filter circuit including the capacitors 170 and 172 and a resistor 174 is connected between the junction of the inductors 164 and the resistors 166 and 168. The collector of the transistor 140 is connected to an output terminal 176 connected to the flip-flop circuit 44 (FIG. 2). The junction of the resistors 146 and 148 is connected to one of the input circuits of the NOR gate 48, and through a zener diode 180 to ground.

As previously mentioned, the NAND gate 36 is enabled during the simultaneous presence of the clock pulses ($\overline{Q}$ output of flip-flop 46) and the unipolar pulses from the converter circuit 22. The NOR gate 48 transmits a signal pulse each half cycle of the oscillator signal and also during the simultaneous presence of the unipolar clock pulses and the $\overline{CLK}$ pulses (when NAND gate 38 is enabled). The arrangement is such that a DC voltage is developed at the junction of the diodes 158 and 160 that controls the capacitive effect of the diodes in a direction to synchronize the frequency of oscillation of the oscillator circuit 42 as a multiple of the frequency of the output signals from the repeater 14. If the oscillation frequency shifts, this results in phasing change with respect to the pulses from the converter circuit 22 causing the bias voltage to the voltage sensitive diodes 158 and 160 to shift accordingly and correct the oscillator frequency.

As can be seen by the above description, the circuit of the invention provides an arrangement wherein the repeater output signals, in response to a test signal, can be monitored to determine whether the repeater is properly reproducing the test signals. In the particular embodiment disclosed, a test signal of three sequential bipolar pulses has been used, however, it should be understood that any number of bipolar pulses in a given group can be used and the counter circuit and decoder circuit changed accordingly.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What is claimed is:

1. Apparatus for testing the operation of a digital repeater circuit receiving input signals comprised of sequential groups of digital signals wherein each group includes a preset number of digital signals, said apparatus comprising:

counter circuit means;

control circuit means, having an input circuit for connection to the output circuit of the repeater and an output circuit connected to said counter circuit means, wherein said control circuit means detects the number of digital signals in each group of signals and applies a corresponding number of signal pulses to said counter circuit means and includes a reset circuit for resetting said counter circuit means upon detecting when the last digital signal in a group has been received, and detection circuit means coupled to said counter circuit means for determining whether the number of signal pulses received from said control circuit means corresponds to said preset number of digital signals.

2. Apparatus as defined in claim 1 wherein said control circuit means includes:

a source of clock pulses;

circuit means coupling said input circuit to said source for synchronizing the clock pulses as a function of the frequency of the digital signals from said repeater, and circuit means coupling said source to said counter circuit means to apply a number of clock pulses to said counter circuit means corresponding to the number of digital signals included in a group.

3. Apparatus as defined in claim 2 wherein said detecting means includes:

a decoder circuit coupled to said counter circuit means for determining the count in the counter circuit means, and circuit means coupled between said decoder means and said circuit means that detects the last digital signal in a group, for producing an error signal in the event the count in the counter circuit means is other than a count corresponding to said preset number of digital pulses.

4. Apparatus for testing the operation of a digital repeater circuit receiving input signals comprised of sequential groups of signals wherein each group includes a preset number of digital signals, said apparatus comprising:

a source of clock pulses;

first circuit means for connecting said source to the output of the repeater to synchronize the clock pulses as a function of the frequency of the output digital signals from the repeater;

counter circuit means;

second circuit means for applying clock pulses from said source to said counter circuit means;

control circuit means detecting the presence of sequential digital signals in a group at the output circuit of the repeater for enabling said second circuit means to pass clock pulses equal in number to the number of digital signals in a group so that said counter circuit means receives a count corresponding to the number of digital signals in the group and including a reset circuit for resetting said counter circuit means upon detecting when the last digital signal in a group has been received, and third circuit means for providing an error signal when the count in said counter circuit means at the end of the digital signals in the group does not correspond to said preset number of digital signals.

5. Apparatus as defined in claim 4 wherein said third circuit means includes:

a decoder circuit coupled to said counter circuit means for detecting the count in the counter circuit means, and fourth circuit means coupled between said decoder means and said control circuit means for producing said error signal.

6. Apparatus for testing the operation of a pulse code modulation repeater comprising:

circuit means for generating clock pulses that are synchronized to the pulses from the repeater;

circuit means for counting a number of said clock pulses equal to the number of pulses from the repeater;

circuit means for indicating the presence of a count other than a preset number, and circuit means for resetting said counter circuit means after the last pulse in a group has been received.

* * * * *